United States Patent
Wang et al.

(10) Patent No.: US 8,464,049 B2
(45) Date of Patent: Jun. 11, 2013

(54) METHOD AND SYSTEM OF ACCESSING COPY-PREVENTED ENCRYPTED DATA RESOURCES OVER A NETWORK

(75) Inventors: Donglin Wang, Beijing (CN); Haifeng Jiang, Beijing (CN)

(73) Assignee: Sursen Corp., Beijing (CN)

(*) Notice: Subject to any disclaimer, the term of this patent is extended or adjusted under 35 U.S.C. 154(b) by 640 days.

(21) Appl. No.: 12/109,484

(22) Filed: Apr. 25, 2008

(65) Prior Publication Data

US 2009/0319785 A1    Dec. 24, 2009

Related U.S. Application Data

(63) Continuation-in-part of application No. PCT/CN2006/002838, filed on Oct. 24, 2006.

(30) Foreign Application Priority Data

Oct. 28, 2005    (CN) .......................... 2005 1 0117041

(51) Int. Cl.
    *H04L 9/14*    (2006.01)
    *H04L 9/00*    (2006.01)
    *H04L 9/08*    (2006.01)

(52) U.S. Cl.
    USPC ........... 713/165; 713/150; 713/168; 380/282; 705/51

(58) Field of Classification Search
    USPC .............. 713/165, 150, 168; 380/282; 705/51
    See application file for complete search history.

(56) References Cited

U.S. PATENT DOCUMENTS

| | | | |
|---|---|---|---|
| 2001/0042046 A1* | 11/2001 | Fukuda | 705/51 |
| 2002/0150243 A1* | 10/2002 | Craft et al. | 380/201 |
| 2002/0161997 A1* | 10/2002 | Yamasaki et al. | 713/150 |
| 2004/0098343 A1* | 5/2004 | Kawaki | 705/51 |

FOREIGN PATENT DOCUMENTS

| | | | |
|---|---|---|---|
| CN | 1340795 | * | 3/2002 |
| CN | 1340795 A | | 3/2002 |
| CN | 1501283 A | | 6/2004 |
| CN | 1502186 | | 6/2004 |
| EP | 1 580 644 A2 | | 9/2005 |
| WO | 02/100069 | | 12/2002 |

OTHER PUBLICATIONS

European Search Report: PCT/CN2006002838.
English translation of the First Chinese Office Action.
Second Chinese Office Action.
Third Chinese Office Action.
First European Office Action.
International Search Report mailed Feb. 8, 2007; PCT/CN2006/002838.

* cited by examiner

*Primary Examiner* — Brandon Hoffman
*Assistant Examiner* — Samuel Ambaye
(74) *Attorney, Agent, or Firm* — Goodwin Procter LLP

(57) ABSTRACT

A system of accessing a copy-prevented encrypted data file transmitted over a network includes a server apparatus having data files; and a client apparatus comprising a read apparatus and a temporary storage. A data file in a server apparatus is accessed through the network from the client apparatus and cached in the temporary storage, and the data file cached in the temporary storage is obtainable by the read apparatus for human recognition of the content of the data file. The read apparatus is not capable of at least one of printing and saving as. The present invention also provides a method of accessing a copy-prevented encrypted data file from a server apparatus. The system and method improve data file transmission security and decrease the possibility of copying and decrypting the data file.

20 Claims, 10 Drawing Sheets

METHOD AND SYSTEM OF ACCESSING COPY-PREVENTED ENCRYPTED DATA RESOURCES OVER A NETWORK

FIELD OF THE INVENTION

The present invention relates to a method and system of accessing copy-prevented encrypted data resources transmitted over a network such as the data resources provided online without being intercepted in transmission. The present invention can be well applied to many types of networks especially those using the "server-client" mode and is directed to providing a superior copy prevention technique over the conventional full download and streaming media techniques.

BACKGROUND OF THE INVENTION

Great amounts of digitalized information resources are offered online, and digital work piracy and possible infringement of the legal rights associated with the data resources offered on online are growing and serious concern to the data resource owners. As such, the manner of network resource utilization and the means for data transmission are restricted in order to protect the interests of the right holders and to prevent illegal replication of the network resources.

Two well-known methods of network data resource utilization for preventing network data resources from being copied and decrypted are shown in FIGS. 1-2. The first method as shown in FIG. 1 is a process involving authenticating a logged-in user, and transmitting encrypted data resources to the authenticated user with a time period of validity preset to the encrypted data resources designed to prevent the data resources from being illegally copied after the initial download. In this method, the identity of a user is first authenticated in a "user login" process to prevent unauthorized users from entering the system. The authenticated user may then search on a data resource platform to find the needed data resources. Thereafter, the found data resources are downloaded (payment may be required for some resources) into the user's local machine in the form of a file or a temporary directory. When the user needs to use the data resources, an invoke command is used to access the data resources. This conventional method presets an expiration time to the downloaded data resources such that the data resources will no longer be available to a user after a lapse of a preset expiration time since the initial downloading of the data resources. In this method, copying of the data resources is restricted by bundling the downloaded data resources with the user's machine, and the availability of the data resources is limited by a preset expiration time compared with the on-going time of the user's machine, which would then determines the period of availability of the downloaded data resources. Although this method provides some measure of protection from illegal replication, this conventional method has a defect in that the data resources will be free to be decrypted and copied once the data resources are fully downloaded into the user's machine (e.g., a personal computer) and saved in the local hard disk drive. As a result, the copyright of the data resources is still beyond protection according to this conventional method.

FIG. 2 shows another conventional method of accessing data resources over a network intended for preventing the network data resources from unauthorized replication and decryption. In this conventional method, the data resources are provided in a form of data streams as in a typical streaming media method, instead of downloading and storing in a local machine. A streaming media is a continuous time based media in the Internet that utilizes a streaming transmission technique, which is the key technique for achieving the streaming media. The streaming media technology enables a constant-rate transmission of the data from a transmitting end to a receiving end and enables the receiving end to process the data during transmission without having to wait for the entire transmission to complete. The second method as shown in FIG. 2 is different from the first method of FIG. 1 in that the data resources are not fully downloaded into a local machine but instead are cached in the system memory of the local machine. Thus, the second conventional method involves a process requiring a continuous downloading of data and caching of the data for use by a user. The data resources are not saved in the hard disk of a local machine or in any other storage device for later use but are instead temporarily stored in the system memory and are then deleted from the system memory after terminating the process. The second conventional method adopts a Digital Rights Management (DRM) technology (e.g., inserting anti-replication codes into digital network resources) intended for preventing the data resources from unauthorized copying and decryption after a user download, thereby to limit the illegal replication of the data resources to some extent.

However, when data resources are provided in data streams, encryption schemes for the data resources are limited. The most commonly adopted encryption scheme is the data header encryption, which allows continuous data resource download and utilization by a user once the user terminal has gone through the data header authentication. In a data header encryption, a whole data file can be obtained only if the data header is decrypted. In addition, utilization of the data resources by programs on a user terminal may also be subjected to the network conditions.

SUMMARY OF THE INVENTION

In view of the defects in the prior art concerning security of network data resources, the present invention provides a more effective system and method for protecting network data resources in storage or in transmission from illegal downloading, replication, interception, and decryption.

The system of accessing a copy-prevented encrypted data file transmitted over a network includes:
a server apparatus having data files; and
a client apparatus comprising a read apparatus and a temporary storage,
   in which a data file in a server apparatus is accessed through the network from the client apparatus and cached in the temporary storage, and
   in which the data file cached in the temporary storage is obtainable by the read apparatus for human recognition of the content of the data file, and
   further in which the read apparatus is not capable of at least one of printing and saving as.

The server apparatus may comprise:
a network server, and
a data resource server comprising a data file storage for storing encrypted data files; and
the client apparatus may further comprise:
a client apparatus transceiver; and
a client apparatus decryptor for decrypting an encrypted data file and caching the decrypted data file into the temporary storage, wherein the client apparatus decryptor is operably connected to the server apparatus over the network via the client apparatus transceiver, and the data file obtainable by the read apparatus is the data file decrypted by the client apparatus decryptor.

And the data files stored in the server apparatus may be processed through a first encryption, and the decryption key for the first encryption is embedded in the read apparatus and/or in the data files.

The data files stored in the server apparatus may be processed through a second encryption, and part or whole of the decryption key for the second encryption is associated with attribute parameters of the server apparatus.

The network server may comprise an encryptor for performing a dynamic third encryption on the data files.

The method of accessing a copy-prevented encrypted data file from a server apparatus which includes a network server and a data resource server having data files by a client apparatus which includes a temporary storage and a read apparatus, in which the client apparatus is operably connected to the server apparatus over a network, includes:

sending a download request to the network server for caching the data file into the temporary storage of the client apparatus;

after receiving the download request, sending, by the server apparatus, the requested data file to the client apparatus;

caching, by the client apparatus, the data file into the temporary storage, in which the data file cached in the temporary storage is obtainable by the read apparatus of the client apparatus for human recognition of the content of the data file, and in which the read apparatus is not capable of transferring the data file saved in the temporary storage to a different medium.

The encryption transmission method and system, which are provided by the present invention for protecting data resources from being copied, greatly improve the security of data resources by applying three encryptions. In an embodiment, the first encryption prevents the digital resources from being read by any other read apparatuses but the specified read apparatus, and therefore the utilization of the data resources can be controlled by controlling the use of the read apparatus. In an embodiment, the second encryption binds the data resources with hardware at the server end, hence a copy of the data resources obtained from the data resource server by intruding the hardware will be unreadable due to the lack of the key for the second encryption. In an embodiment, the dynamic third encryption ensures the security of the data resources in transmission on the network. The system in the server apparatus is configured to accept only the requests for downloading the data file into the temporary storage, and the read apparatus is not equipped with at least one function of "print" and "save as", so that the client can neither download nor save the data resources but only read the data resources with the read apparatus, which prevents the illegal utilization of the data resources to a great extent.

DESCRIPTION OF SPECIFIC EMBODIMENTS

Various embodiments of the present invention including the preferred are described with reference to the accompanying drawings.

System Embodiment 1

Figure 1:
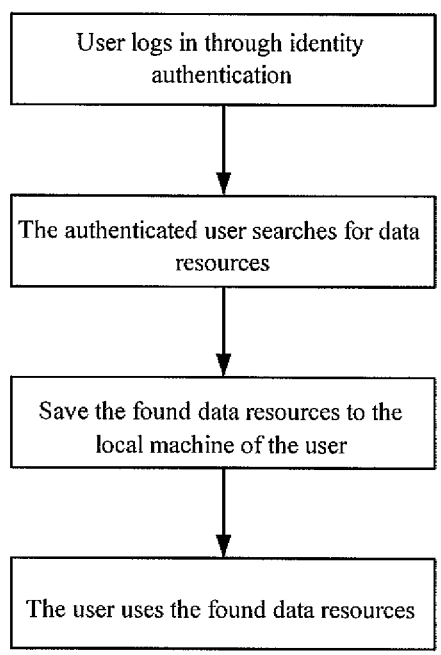
FIG. 1 is a flow chart of the conventional method of accessing network data resources over a network.
Figure 2:
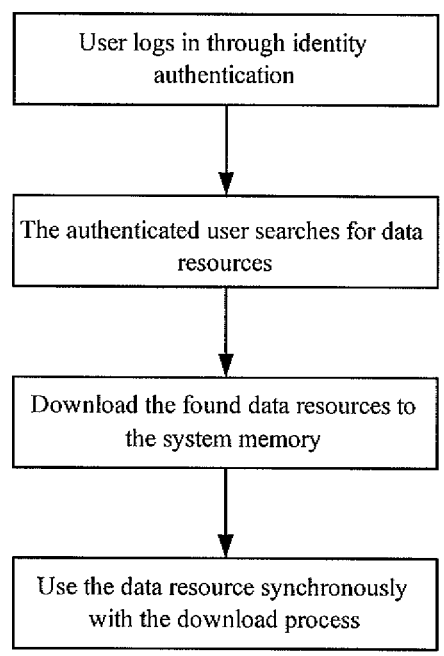
FIG. 2 is a flow chart of another conventional method of accessing network data resources over a network.
Figure 3:
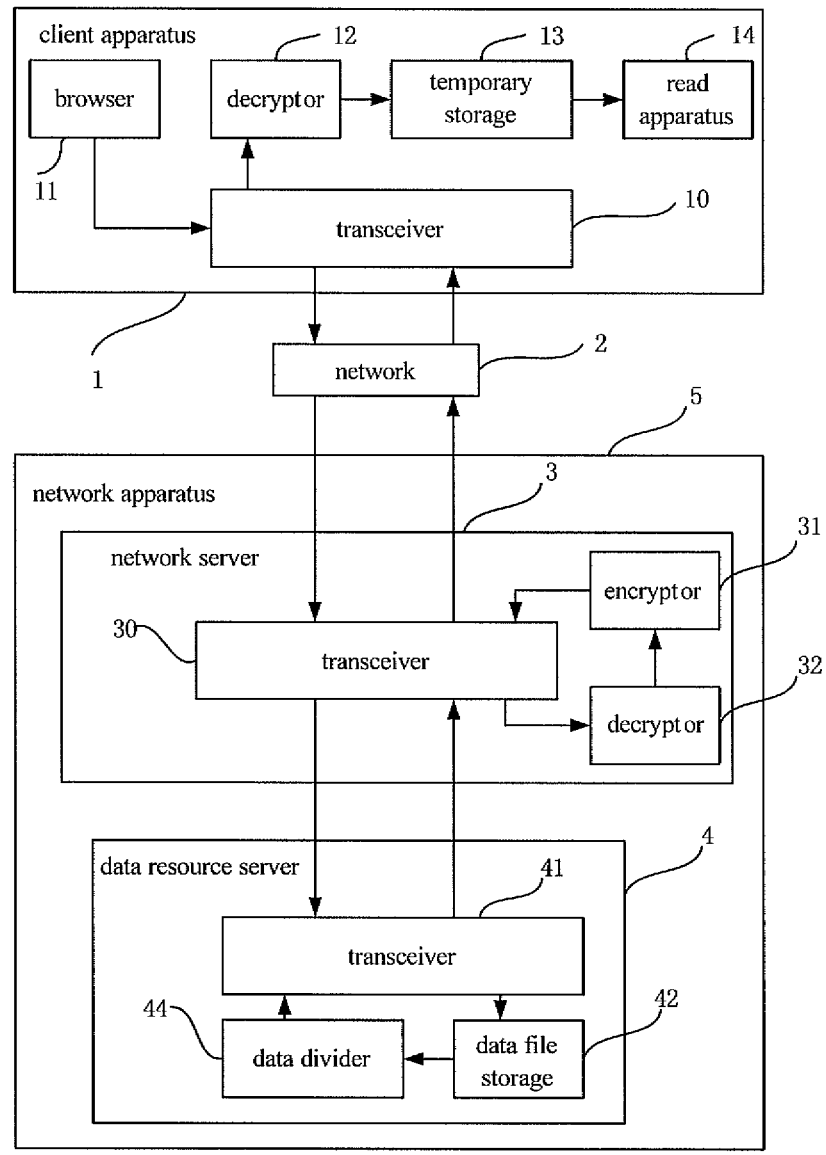
FIG. 3 is a block diagram showing an encryption transmission system for preventing copying of data resources in accordance with an embodiment of the present invention.

As shown in FIG. 3, an encryption transmission system for preventing copying of data resources in accordance with an embodiment of the present invention includes a client apparatus 1, a network 2, and a server apparatus 5. The client apparatus 1 includes a decryptor 12, a browser 11, a temporary storage 13, a transceiver 10, and a read apparatus 14. The temporary storage 13 may be a storage medium with a temporary storage function, e.g., a system memory or a virtual memory. The server apparatus 5 includes a network server 3 and a data resource server 4. The network server 3 includes a transceiver 30, a decryptor 32, and an encryptor 31, and the data resource server 4 includes a transceiver 41, a data file storage 42, and a data divider 44. The client apparatus 1 is connected via the network 2 to the server apparatus 5 which includes the network server 3 and the data resource server 4.

The client apparatus 1 is allowed to cache the data resources from the server apparatus 5 only in the temporary storage 13, not in any other permanent storages; the read apparatus 14 is not equipped with the functions "save as" and/or "print"; and the network server 3 only accepts download requests from the client apparatus 1 which requests to download data resources into the temporary storage 13 of the client apparatus 1.

Figure 9:
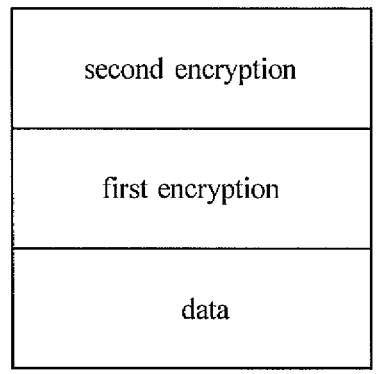
FIG. 9 is a table for illustrating the storage format of a data resource file in a data resource server in accordance with an embodiment of the present invention.

The data file storage 42 is used for storing data files and performing a first encryption and a second encryption on the data files. The format of the first and second encrypted data files is shown in FIG. 9. The decryption key for the first encryption of a data file is embedded in the read apparatus 14 of the client apparatus 1, and this allows only a read apparatus of a corresponding type (i.e., the read apparatus 14) to read the data file. The decryption key for the second encryption of the data file is saved in the decryptor 32 of the network server 3 and is, together with the encryption key, associated with the hardware parameters of the network server 3, which binds the data file to the hardware of the server at the server end.

Figure 10:
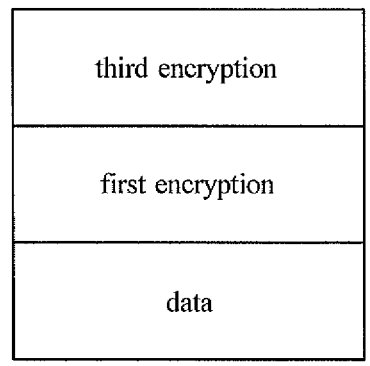
FIG. 10 is a table for illustrating the format of a data file received by the client apparatus in the encryption transmission system for preventing copying of data resources in accordance with an embodiment of the present invention.

The system shown in FIG. 3 functions through the following process. A user first logs into the network data resource system at the client apparatus 1 and goes through a user identity authentication process. The user can then search for and find a needed data resource file (e.g., an e-book file) using the browser 11. The user would then click a corresponding button to initiate a download task by sending a data download request carrying the user identity information from the transceiver 10 of the client apparatus 1 to the network server 3. The network server 3 verifies and accepts the download request and sends an invoke request from the transceiver 30 to the data resource server 4 to get the corresponding data resource file. Upon receipt of the data resource invoke request from the network server 3, the data resource server 4 retrieves the corresponding data file from the data file storage 42, divides the data file according to a determined division policy (e.g., divides the data file by page) with the data divider 44, and sends the divided data file to the network server 3 using the transceiver 41. Upon receipt of the data file through the transceiver 30, the network server 3 decrypts the data file which has been through the second encryption with the decryptor 32 (i.e. decrypts the second encryption), and performs a third encryption on the data file with the encryptor 31. The format of the encrypted data file after the third encryption has been performed is shown in FIG. 10. The transceiver 30 sends the encrypted data file to the client apparatus 1 through the network 2. Upon receipt of the data units of the data file through the transceiver 10, the client apparatus 1 caches the data file in the temporary storage 13; the decryptor 12 decrypts the received data file which has been through the third encryption in real time (i.e. decrypts the third encryption), saves the decrypted data file in the temporary storage 13, and deletes the undecrypted data of the received data file from the temporary storage 13; the read apparatus 14 invokes the data file (the third encryption of which has been decrypted) from the temporary storage 13 and decrypts the data file using the embedded decryption key for the first encryption; after a user finishes utilizing the data file, the read apparatus 14 deletes the data file from the temporary storage 13 in real time.

The third encryption adopts dynamic encryption (e.g., synchronous hopping code). Initial encryption and decryption keys are set in advance in the encryptor 31 of the network server 3 and the decryptor 12 of the client apparatus 1, and the keys in both apparatuses hop synchronously at the transmission of each data block, wherein the same basic information is adopted by both apparatuses as the synchronization information from which the keys hop synchronously.

The third encryption may also adopt an asymmetrical algorithm (e.g. Rivest-Shamir-Adelman algorithm), according to which the decryptor 12 of the client apparatus 1 randomly generates a public key and a private key, sends the public key to the encryptor 31 of the network server 3 to encrypt blocks of the data file, and then decrypts the data file in the client apparatus 1 with the corresponding private key.

The third encryption may also be performed by the encryptor 31 on the data file with a random cipher key. The encryptor 31 sends the random third cipher key to the client apparatus 1 before sending the data file, and the data file will only be sent to the client apparatus 1 from the transceiver 30 when an acknowledgement of receipt of the key is received. The decryptor 12 in the client apparatus 1 decrypts the received data file with the received key in real time, saves the decrypted data in the temporary storage, and deletes the undecrypted data of the received data file and the key in real time.

System Embodiment 2

Figure 4:
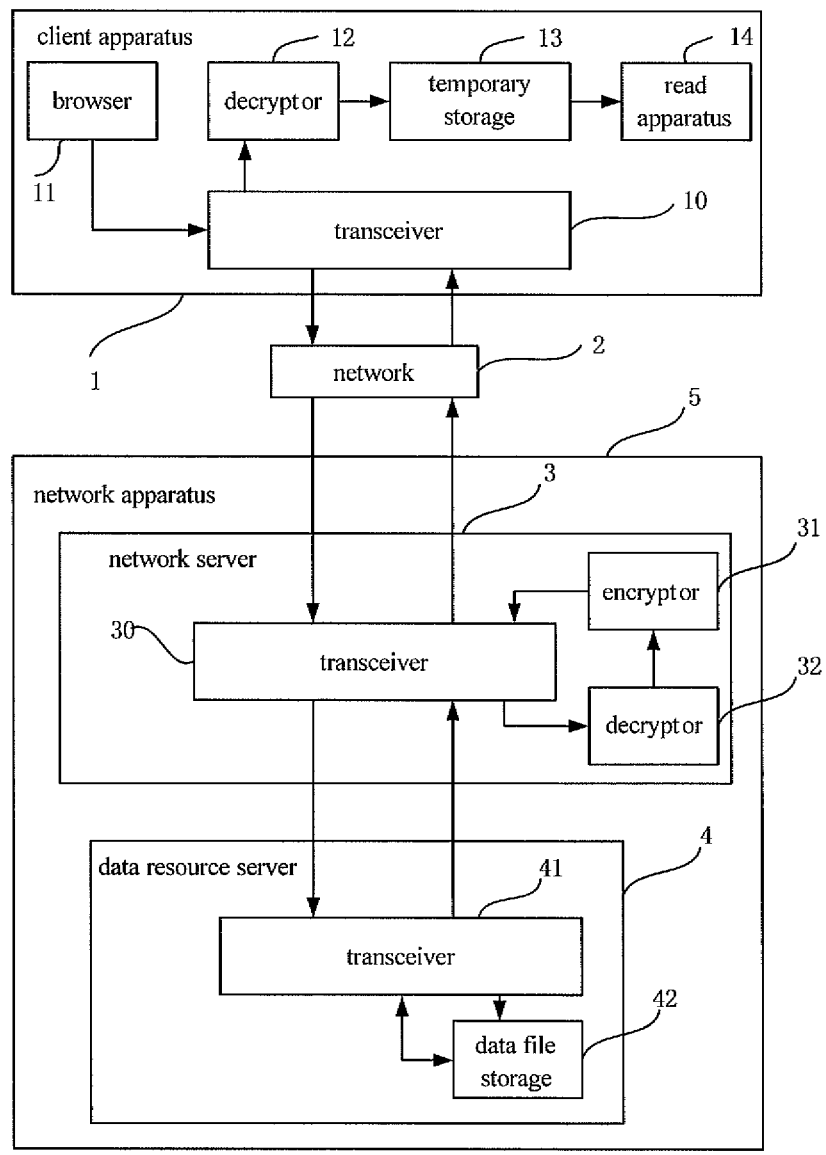
FIG. 4 is a block diagram showing an encryption transmission system for preventing copying of data resources in accordance with another embodiment of the present invention.

As shown in FIG. 4, an encryption transmission system for preventing copying of data resources in accordance with an embodiment of the present invention includes a client apparatus 1, a network 2 and a server apparatus 5. The client apparatus 1 includes a decryptor 12, a browser 11, a temporary storage 13, a transceiver 10, and a read apparatus 14. The temporary storage 13 may be a storage medium with temporary storage function (e.g., a system memory or a virtual memory). The server apparatus 5 includes a network server 3 and a data resource server 4. The network server 3 includes a transceiver 30, a decryptor 32, and an encryptor 31; and the data resource server 4 includes a transceiver 41 and a data file storage 42. The client apparatus 1 is connected via the network 2 to the server apparatus 5 which includes the network server 3 and the data resource server 4.

Data files stored in the data file storage 42 are divided into relatively separate data sub-files according to a determined page dividing policy in advance, and every sub-file is subjected to a first encryption and a second encryption. The format of an encrypted data sub-file is shown in FIG. 9. The decryption key for the first encryption is embedded in the read apparatus 14 of the client apparatus 1; the decryption key for the second encryption is saved in the decryptor 32 of the network server 3 so that the decryptor 32 may decrypt a data file when the network server 3 obtains the data file.

The client apparatus 1 is configured to limit the download function, i.e., can only cache the data resources received from the server apparatus 5 in the temporary storage 13 instead of any other permanent storages; the read apparatus 14 is not equipped with the functions of "save as" and/or "print"; and the network server 3 only accepts download requests from the client apparatus 1 which requests to download data resources into the temporary storage 13 in the client apparatus 1.

The work flow of the system shown in FIG. 4 is similar to the work flow of the system in Embodiment 1 with the difference between the two systems being that the data files have already been divided according to the determined page dividing policy and saved in the data file storage 42, and as such, the step of dividing the data file is omitted in the work flow of the system shown in FIG. 4.

System Embodiment 3

Figure 5:
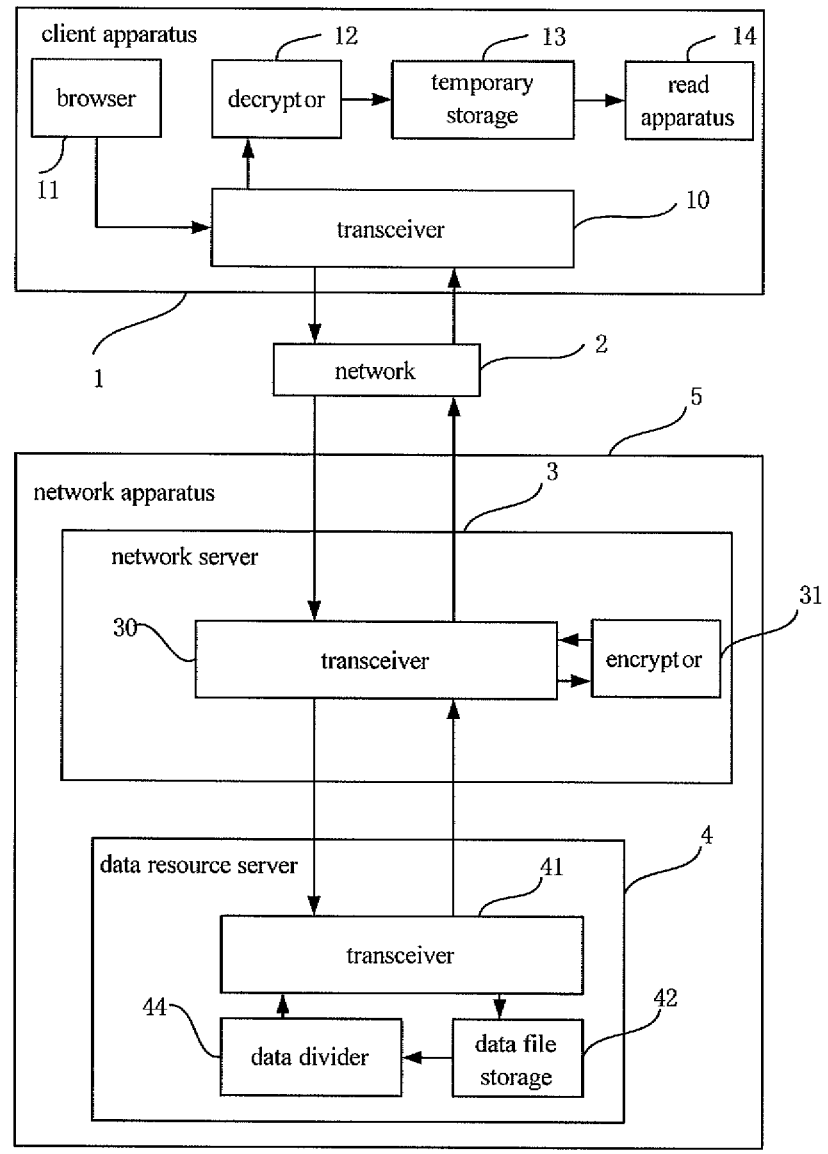
FIG. 5 is a block diagram showing an encryption transmission system for preventing copying of data resources in accordance with yet another embodiment of the present invention.

As shown in FIG. 5, an encryption transmission system for preventing copying of data resources in accordance with an embodiment of the present invention includes a client apparatus 1, a network 2, and a server apparatus 5. The client apparatus 1 includes a decryptor 12, a browser 11, a temporary storage 13, a transceiver 10, and a read apparatus 14. The temporary storage 13 may be a storage medium with a temporary storage function (e.g., a system memory or a virtual memory). The server apparatus 5 includes a network server 3 and a data resource server 4. The network server 3 includes a transceiver 30 and an encryptor 31; and the data resource server 4 includes a transceiver 41, a data file storage 42, and a data divider 44. The client apparatus 1 is connected via the network 2 to the server apparatus 5 which includes the network server 3 and data resource server 4.

The client apparatus 1 is configured to limit the download function (i.e., can only cache the data resources received from the server apparatus 5 in the temporary storage 13 instead of any other permanent storages); the read apparatus 14 is not equipped with the functions "save as" and/or "print"; and the network server 3 only accepts download requests from the client apparatus 1 which requests to download data resources into the temporary storage 13 in the client apparatus 1.

The data file storage 42 is used for storing data files and performing a first encryption and a second encryption on the data files. The format of the encrypted data files is shown in FIG. 9. The decryption key for the first encryption of a data file is embedded in the read apparatus 14 of the client apparatus 1 and allows only a read apparatus of a corresponding type (i.e., the read apparatus 14) to read the data file. The decryption key for the second encryption of the data file is saved in the decryptor 31 of the network server 3 and is associated with the hardware parameters of the network server 3, which binds the data file with the hardware of the server at the server end.

Figure 11:
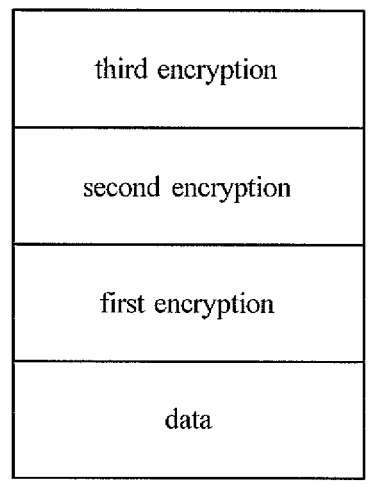
FIG. 11 is a table for illustrating another format of a data file received by the client apparatus in the encryption transmission system for preventing copying of data resources in accordance with an embodiment of the present invention.

The system shown in FIG. 5 functions through the following process. A user first logs into the network data resource system at the client apparatus 1 through a user identity authentication process. The user can then search for and find a needed data resource file (e.g., an e-book file) using the browser 11. The user would click a corresponding button to initiate a download task by sending a data download request carrying the user identity information from the transceiver 10 of the client apparatus 1 to the network server 3. The network server 3 verifies and accepts the download request and sends an invoke request from the transceiver 30 to the data resource server 4 to get the corresponding data resource file. Upon receipt of the data resource invoke request from the network server 3, the data resource server 4 retrieves the corresponding data file from the data file storage 42, divides the data file according to a determined division policy with the data divider 44, and sends the divided data file to the network server 3 using the transceiver 41. Upon receipt of the data file through the transceiver 30, the network server 3 performs a third encryption on the data file with the encryptor 31. The format of the encrypted data file is shown in FIG. 11. The transceiver 30 then sends the encrypted data file to the client apparatus 1 through the network 2. Upon receipt of data file through the transceiver 10, the client apparatus 1 decrypts the data file in real time with the decryptor 12 using the second and the third decryption keys, and the undecrypted data of the received data file is deleted in real time. The decrypted data file is stored in the temporary storage 13, and the read apparatus 14 invokes the data file from the temporary storage 13 and decrypts the data file with the embedded decryption key for the first encryption of the data file. After a user finishes utilizing the data file, the read apparatus 14 deletes the data file from the temporary storage in real time.

The third encryption may adopt dynamic encryption (e.g., synchronous hopping code encryption) in which initial encryption and decryption keys are set in advance in the encryptor 31 of the network server 3 and the decryptor 12 of the client apparatus 1, and the encryption and decryption keys hop synchronously in both apparatuses according to the same basic information.

The third encryption may also be performed as follows: the decryptor 12 of the client apparatus 1 randomly generates a public key and a private key and sends the public key to the encryptor 31 of the network server 3 to encrypt blocks of the data file, and then decrypts the data file in the client apparatus 1 with the corresponding private key.

The third encryption may also be performed by the encryptor 31 on (each page of) the data file with a random cipher key. The encryptor 31 sends the random third cipher key to the client apparatus 1 before sending (each page of) the data file, and the data file will only be sent to the client apparatus 1 from the transceiver 30 when an acknowledgement of receipt of the key is received. The decryptor 12 in the client apparatus 1 decrypts the received data file with the received key in real time, saves the decrypted data in the temporary storage 13, and deletes the undecrypted data of the data and the key in real time.

Upon receipt of the download request from the client apparatus 1 to the network server 3, the key for the second encryption is sent from the network server 3 to the decryptor 12 of the client apparatus 1 through the network 2 for decrypting the second encryption of the data file.

System Embodiment 4

Figure 6:
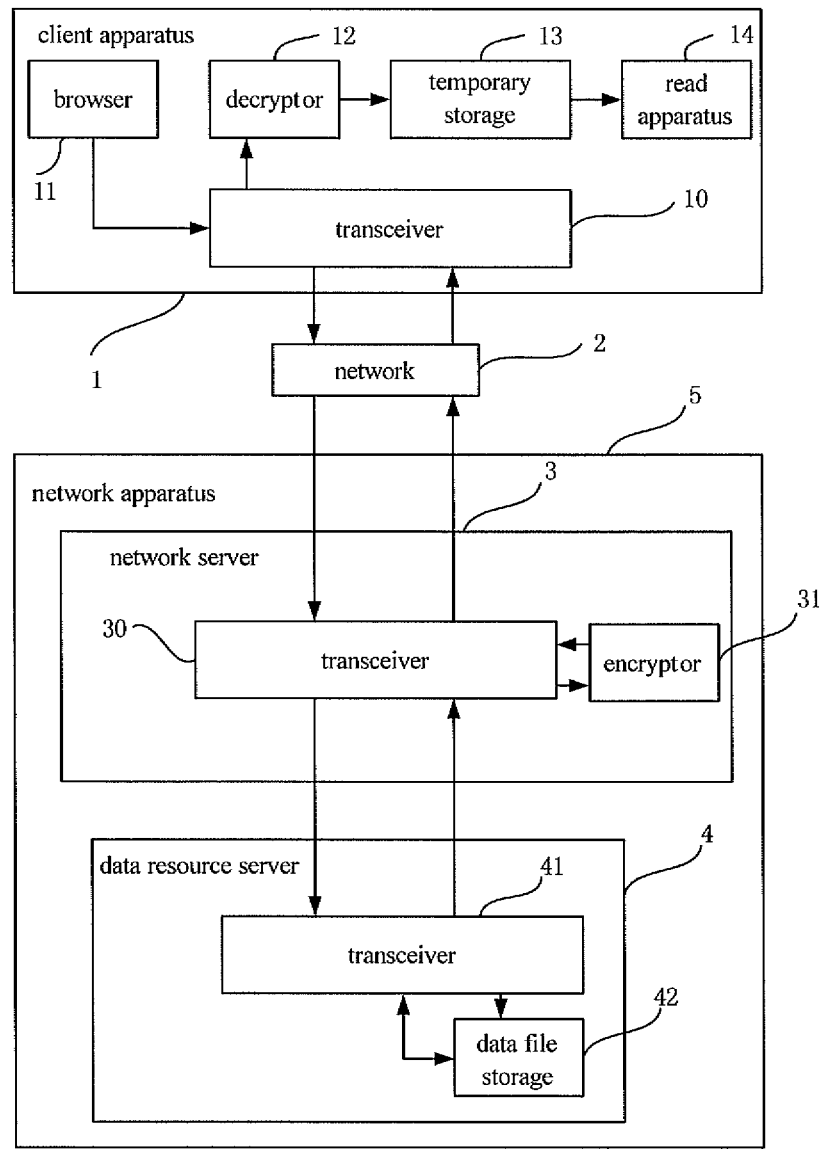
FIG. 6 is a block diagram showing an encryption transmission system for preventing copying of data resources in accordance with further another embodiment of the present invention.

As shown in FIG. 6, an encryption transmission system in accordance with an embodiment of the present invention for preventing copying data resources includes a client apparatus 1, a network 2, and a server apparatus 5. The client apparatus 1 includes a decryptor 12, a browser 11, a temporary storage 13, a transceiver 10, and a read apparatus 14. The temporary storage 13 may be a storage medium with temporary storage function (e.g., a system memory or a virtual memory). The server apparatus 5 includes a network server 3 and a data resource server 4. The network server 3 includes a transceiver 30 and an encryptor 31, and the data resource server 4 includes a transceiver 41 and a data file storage 42. The client apparatus 1 is connected via the network 2 to the server apparatus 5 which includes the network server 3 and the data resource server 4.

The client apparatus 1 is configured to limit the download function (i.e., can only cache the data resources received from the server apparatus 5 in the temporary storage 13 instead of any other permanent storages); the read apparatus 14 is not equipped with the functions of "save as" and/or "print"; and the network server 3 only accepts download requests from the client apparatus 1 which requests to download data resources into the temporary storage 13 of the client apparatus 1.

Data files stored in the data file storage 42 are divided into relatively separate data sub-files according to a determined page dividing policy in advance, and every sub-file is processed through a first encryption and a second encryption. The format of an encrypted data sub-file is shown in FIG. 9. The decryption key for the first encryption of a data file is embedded in the read apparatus 14 of the client apparatus 1 and allows only a read apparatus of corresponding type (i.e., the read apparatus 14) to read the data file. The decryption key for the second encryption of the data file is saved in the decryptor 31 of the network server 3 and is, together with the encryption key, associated with the hardware parameters (e.g., the identification number) of the network server 3, which binds the data file with the hardware of the server at the server end.

The system shown in FIG. 6 functions through the following process. A user first logs into the network data resource system at the client apparatus 1 through a user identity authentication process. The user then searches for and finds a needed data resource file (e.g., an e-book file) using the browser 11, and clicks a corresponding button to initiate a download task by sending a data download request carrying the user identity information from the transceiver 10 of the client apparatus 1 to the network server 3. The network server 3 verifies and accepts the download request and sends an invoke request from the transceiver 30 to the data resource server 4 to get the corresponding data resource file. Upon receipt of the data resource invoke request from the network server 3, the data resource server 4 retrieves the corresponding data file from the data file storage 42, and sends the data file to the network server 3 using the transceiver 41. Upon receipt of the data file through the transceiver 30, the network server 3 performs a third encryption on the data file with the encryptor 31. The format of the encrypted data file is shown in FIG. 11. The transceiver 30 then sends the encrypted data file to the client apparatus 1 through the network 2. Upon receipt of data units of the data file through the transceiver 10, the client apparatus 1 decrypts the data file in real time with the decryptor 12 by using the second and the third decryption keys. The decrypted data file is then saved in the temporary storage 13, and the undecrypted data of the received data file is deleted in real time. The read apparatus 14 invokes the data file from the temporary storage 13 and decrypts the data file with the embedded decryption key for the first encryption of the data file. After utilization of the data file is finished, the read apparatus 14 deletes the data file from the temporary storage 13 in real time.

The third encryption adopts a dynamic encryption pattern (e.g., synchronous hopping code encryption) wherein initial encryption and decryption keys are set in advance in the encryptor 31 and the decryptor 12, and the encryption and decryption keys hop synchronously in both apparatuses according to the same basic information.

The third encryption may also be performed as follows: the decryptor 12 of the client apparatus 1 randomly generates a public key and a private key, and then sends the public key to the encryptor 31 of the network server 3 to encrypt blocks of the data file, and then decrypts the data file in the client apparatus 1 with the corresponding private key.

The third encryption may also be performed by the encryptor 31 on (each page of) the data file with a random cipher key. The encryptor 31 sends the random third cipher key for the client apparatus 1 before sending (each page of) the data file, and the data file will only be sent to the client apparatus 1 from the transceiver 30 when an acknowledge of receipt of the key is received.

Upon receipt of the download request from the client apparatus 1 to the network server 3, the key for the second encryption is sent from the network server 3 to the decryptor 12 of the client apparatus 1 through the network 2 for decrypting the second encryption of the data file.

In addition to the embodiments of the present invention as described above, the network server 3 and the data resource server 4 can be combined into a single apparatus, in which the transceiver 30 and the transceiver 41 are actually the same component of the apparatus.

Figure 7:
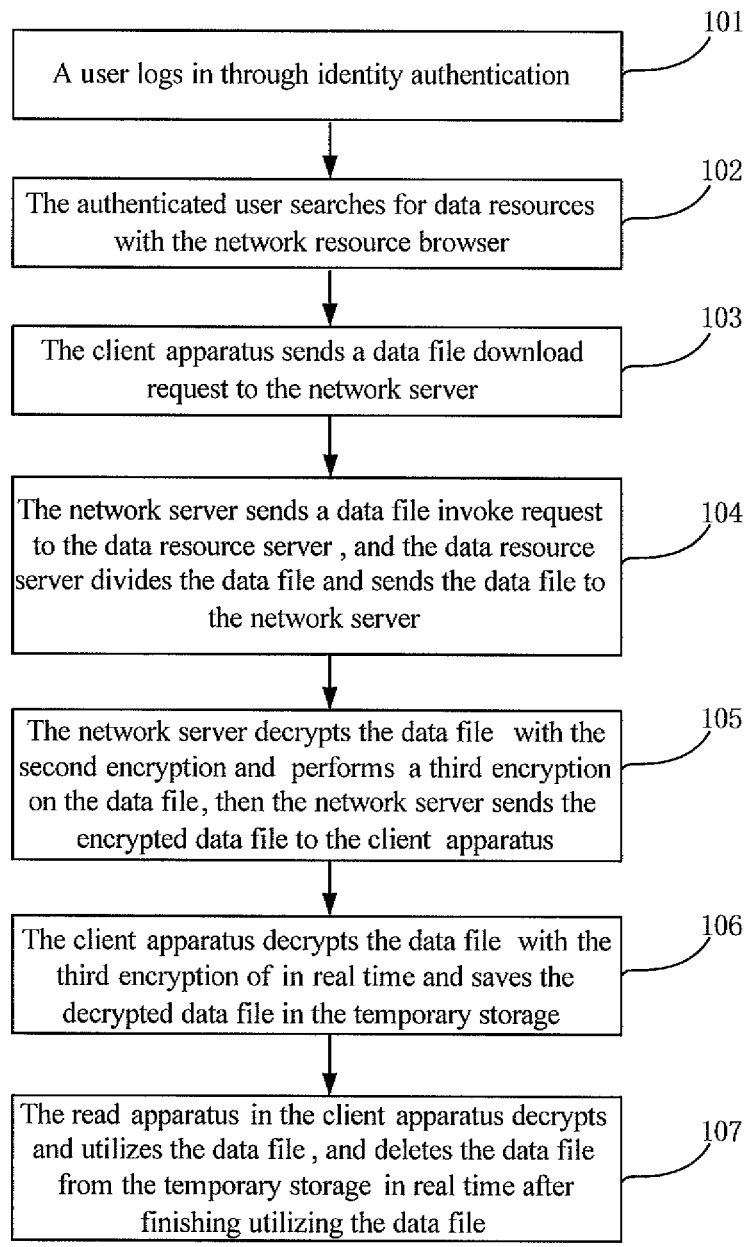
FIG. 7 is a flow chart of the encryption transmission method for preventing copying of data resources in accordance with an embodiment of the present invention.

An embodiment of the present invention also provides an encryption transmission method for preventing copying data resources, as shown in FIG. 7, including the following steps.

Step 101: a user logs in through an identity authentication process.

The client apparatus authenticates the user identity via an authentication code or the IP address of the user, and the user is allowed to enter the data resource system only after passing the authentication. This process blocks unauthorized users from entering the system and improves the security of the data resources.

Step 102: the authenticated user searches for needed data resources using a network resource browser.

The browser may be Microsoft Internet Explorer or any other application through which a user may download a data file into a temporary storage (e.g., a system memory or a virtual memory).

Step 103: the user having selected the needed data resources clicks the download button in the client apparatus to initiate a download task by sending a data resource download request to a network server; the download request carries the identity information of the client apparatus (e.g., the IP address information of the client apparatus).

Step 104: the network server verifies and accepts the download request, and sends an invoke request to the data resource server to get the corresponding data file. Data resource files are saved in a data resource server in advance, and every data file is processed through two encryptions. The key for the first encryption is embedded in a read apparatus in the client apparatus, and the key for the second encryption is saved in a decryptor in the network server. Upon receipt of the invoke request from the network sever, the data resource server divides the requested data file according to a determined division policy (e.g., dividing by page) and sends the data file to the network server.

Step 105: the network server decrypts the data file which has been through the second encryption (i.e. decrypts the second encryption) and performs a third encryption on the data file. Multiple encryption patterns can be randomly adopted for the third encryption (i.e., a data unit of the data file may be encrypted in a pattern different from the encryption pattern of the subsequent data unit) and the network server sends the encrypted data file to the client apparatus through a transceiver over the network. The third encryption may also adopt synchronous hopping code encryption, in which initial encryption and decryption keys are set in advance in the encryptor of the network server and the decryptor of the client apparatus, and the encryption key and decryption key hop synchronously in both apparatuses at each transmission of a data block. The decryptor of the client apparatus may also randomly generate a public key and a private key. The public key is sent to the encryptor of the network server to encrypt the data file blocks as the third encryption, and the private key is used for decrypting the data file in the client apparatus. The encryptor of the network server may also encrypt (each page of) the data file with a random encryption key, and send the random decryption key to the client apparatus before sending the encrypted (each page of) data file. In this case, the encrypted data file is sent to the client apparatus through the transceiver only when an acknowledgement of the receipt of the key is received.

Step 106: upon receipt of the data file, the client apparatus decrypts the data file in real time with the decryption key for the third encryption, and saves the decrypted data file in the temporary storage for the read apparatus to invoke. The undecrypted data of the received data file is deleted in real time. The read apparatus decrypts the data file which has been through the first encryption with the embedded key for the first encryption.

Step 107: having finished utilizing the data file, the read apparatus deletes the data file from the temporary storage in real time.

Figure 8:
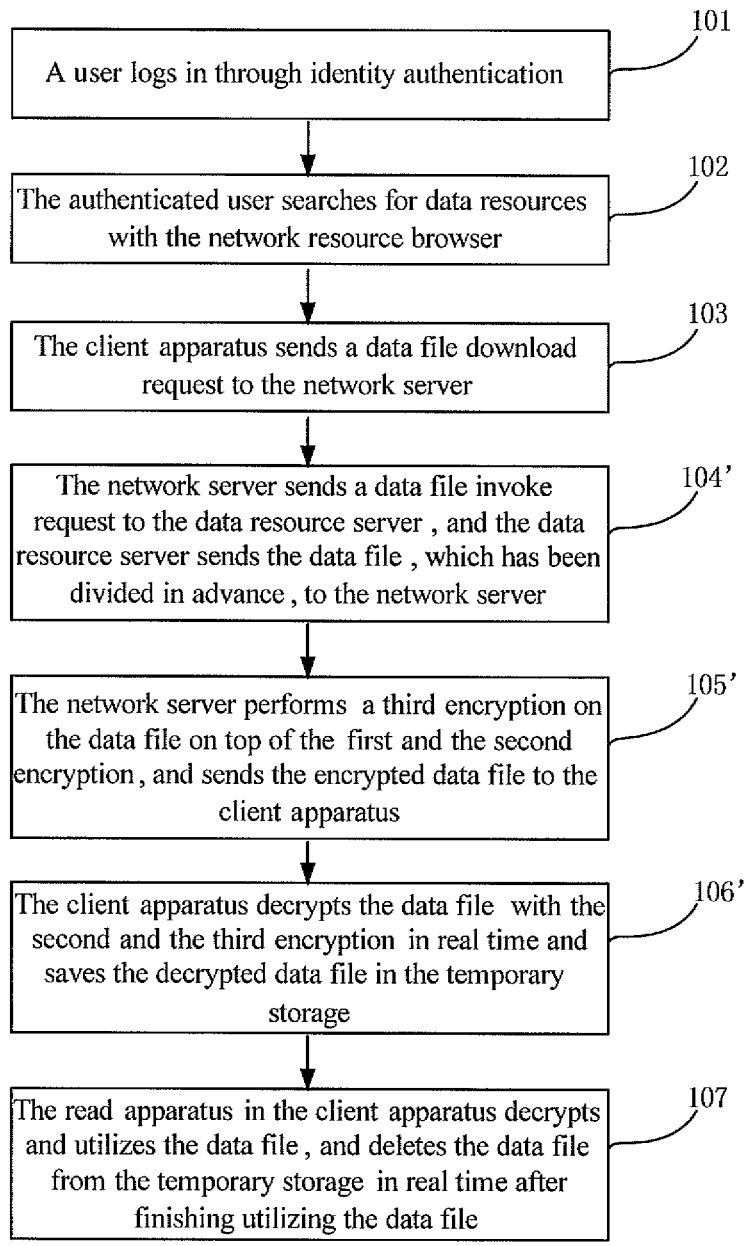
FIG. 8 is a flow chart of the encryption transmission method for preventing copying of data resources in accordance with another embodiment of the present invention.

The encryption transmission method provided by the present invention for preventing copying data resources may also include the following steps, as shown in FIG. 8.

Step 101: a user logs in through identity authentication.

The client apparatus authenticates the user identity via an authentication code or the IP address of the user, and the user is allowed to enter the data resource system only after passing the authentication. The process blocks unauthorized users from entering the system and improves the security of the data resources.

Step 102: the authenticated user searches for needed data resources using a network resource browser.

The browser may be Microsoft Internet Explorer or any other application which is equipped with a download function in the form of a download button that is used for downloading a data file into a temporary storage (e.g., a system memory or a virtual memory). It should be noted that the downloaded data file will not be saved in a permanent storage (e.g., a hard disk).

Step 103: having selected the needed data resources, the user clicks the download button in the client apparatus to initiate a download task by sending a data resource download request to a network server; the download request carries the identity information of the client apparatus (e.g., the IP address information of the client apparatus).

Step 104': the network server verifies and accepts the download request, and sends an invoke request to the data resource server to get the corresponding data file. Data resource files are saved in a data resource server and are divided into groups of sub files according to a determined division policy (e.g., divides the data source file by page) in advance. Every sub file is subjected to two encryptions. The key for the first encryption is embedded in a read apparatus in the client apparatus, and the key for the second encryption is embedded in a decryptor in the network server. Upon receipt of the invoke request, the data resource server, sends the corresponding data file or a group of corresponding sub files to the network server.

Step 105': the network server performs a third encryption on the data file on top of the first encryption and the second encryption. Multiple encryption patterns can be randomly adopted for the third encryption (i.e., a data file may be encrypted in a pattern different from the encryption pattern of a subsequent data file) and the network server sends the encrypted data file to the client apparatus through a transceiver over the network. The third encryption may also adopt a synchronous hopping code encryption, in which initial encryption and decryption keys are set in advance in the encryptor of the network server and the decryptor of the client apparatus, and the encryption key and decryption key hop synchronously in both apparatuses at each transmission of a data block. The decryptor of the client apparatus may also randomly generate a public key and a private key. The public key is sent to the encryptor of the network server to encrypt the data file blocks as the third encryption, and the private key is used for decrypting the data file in the client apparatus. The encryptor of the network server may also encrypt (each page of) the data file with a random encryption key, and send the random decryption key to the client apparatus before sending the encrypted (each page of the) data file. In this case, the encrypted data file is sent to the client apparatus through the transceiver only when an acknowledgement of the receipt of the key is received.

Step 106': upon receipt of the data file, the client apparatus decrypts the data file in real time with the decryption keys for the second encryption and the third encryption, and saves the decrypted data file in the temporary storage for the read apparatus to invoke. The undecrypted data of the received data file is deleted in real time. The read apparatus decrypts the data file which has been through the first encryption directly with the embedded decryption key for the first encryption.

Step 107: having finished utilizing the data file, the read apparatus deletes the data file from the temporary storage in real time.

The third encryption may also be performed as follows. The encryptor 31 generates a public key and a private key, and sends the public key to the client apparatus 1. The client apparatus 1 generates a cipher key, and encrypts the cipher key by using the public key received from the encryptor 31, and sends the encrypted cipher key to the encryptor 31. The encryptor 31 decrypts the received encrypted cipher key by using the private key and obtains the cipher key. Then the encryptor 31 encrypts the data file with the cipher key and sends the encrypted data file to the client apparatus 1. The client apparatus 1 decrypts the encrypted data file by using the cipher key.

The third encryption may also be performed as follows. The client apparatus 1 generates a public key and a private key, and sends the public key to the encryptor 31. The encryptor 31 generates a cipher key, and encrypts the cipher key by using the public key received from the client apparatus 1, and sends the encrypted cipher key to the client apparatus 1. The client apparatus 1 decrypts the received encrypted cipher key by using the private key and obtains the cipher key. Then the encryptor 31 encrypts the data file with the cipher key and sends the encrypted data file to the client apparatus 1. The client apparatus 1 decrypts the encrypted data file by using the cipher key.

The above two ways for performing the third encryption can be applied to any embodiment described above, and may provide enhanced performance.

As seen from the embodiments, the encryption transmission method and system, which are provided by the present invention for protecting data resources from being copied, greatly improve the security of data resources by applying three encryptions. The first encryption prevents the data resource file from being read with any read apparatus other than the specified read apparatus, and therefore utilization of the data resources can be controlled by controlling the use of the read apparatus. The second encryption binds the data resource file with hardware at the server end, and hence a copy of the data file obtained from the data resource server from its hardware storage will be unreadable. The dynamic third encryption ensures the security of the data file in the transmission over the network. The system with the server apparatus only accepts the request for downloading the data file to the temporary storage, and the read apparatus is not equipped with the functions of "print" and/or "save as". As such, the client can neither download nor save the data resources but instead can only read the data resources with the read apparatus, thus further preventing illegal utilization of the data resources to a great extent.

The encryption transmission method and system provided by the present invention for protecting data resources from being copied are not limited to the embodiments described herein; e.g., the first encryption of data files in the data file storage may be omitted so that the type of the read apparatuses for reading the data files is not limited.

The system on network server can be configured to disable a copy command entered to copy the data resources, and anti-copy codes may be inserted into the data files to prevent the data resources from being downloaded into the local machine of a client terminal for permanent storage which may increase the possibility of being decrypted.

The application scheme of the present invention is disclosed herein, but is not limited to the description and embodiments given herein. The present invention can be applied to any fields that fit. It should be known to those skilled in the art that modifications can be easily applied to the present invention without departing from the scope defined by the Claims or equivalent descriptions, and that the present invention is not limited by the details of the description and the accompanying drawings.

What is claimed is:

1. A system of accessing a copy-prevented encrypted data file transmitted over a network, the system comprising:
   a server apparatus having data files encrypted twice, a key for decrypting the data files is embedded in a read apparatus in a client apparatus, another key for decrypting the data files is stored in the sever apparatus; and
   the client apparatus comprising the read apparatus and a temporary storage,
      wherein a data file in a server apparatus is accessed through the network by the client apparatus, decrypted by the server apparatus using the key stored in the server apparatus, and
      wherein, the decrypted data file is further encrypted before sent to the client apparatus, the corresponding decrypting key is stored in the client apparatus other than the read apparatus;

wherein the encrypted data file is received by the client apparatus and cached in the temporary storage, the encrypted data file cached in the temporary storage is decrypted using the decrypting key stored in the client apparatus, and the decrypted data file is cached in the temporary storage and further decrypted by the read apparatus using the key embedded in the read apparatus, and the data file further decrypted and cached in the temporary storage is obtainable by the read apparatus for human recognition of the content of the data file, and further wherein the read apparatus is not capable of at least one of printing and saving as.

2. The system according to claim 1, wherein the client apparatus is further capable of deleting the encrypted data file in real time from the temporary storage after decrypting the encrypted data file.

3. The system according to claim 1, wherein the read apparatus is further capable of deleting the data file from the temporary storage in real time after utilizing the data file.

4. The system according to claim 1, wherein the network server and the client apparatus adopt synchronous hopping code for the encryption on the data file decrypted by the server apparatus using the key stored in the server apparatus, in which initial encryption and decryption keys are set in the client apparatus and the network server in advance, and the encryption and decryption keys hop synchronously in both apparatuses at each data transmission.

5. The system according to claim 1, wherein the client apparatus randomly generates a cipher key, sends the cipher key to the network server, and the network server encrypts the data file decrypted by the server apparatus using the key stored in the server apparatus with the cipher key.

6. The system according to claim 5, wherein the cipher key comprises a public key, and the client apparatus decrypts the encrypted data file received by the client apparatus and cached in the temporary storage with a private key.

7. The system according to claim 1, wherein the network server sends a cipher key to the client apparatus after having encrypted a data file using the dynamic encryption.

8. The system according to claim 1, wherein the data resource server further comprises a data divider for dividing data files in the data file storage into sub files according to a determined page dividing policy, and the data file accessed through the network from the client apparatus is a sub file.

9. The system according to claim 1, wherein a data file in the server apparatus is divided into sub files according to a determined page dividing policy, and the data file accessed through the network from the client apparatus is a sub file.

10. The system according to claim 1, wherein the temporary storage is a system memory or a virtual memory.

11. A method of accessing a copy-prevented encrypted data file from a server apparatus which comprises a network server and a data resource server having data files by a client apparatus which comprises a temporary storage and a read apparatus, wherein the client apparatus is operably connected to the server apparatus over a network, and the method comprising:

providing, in the server apparatus, a data file which is encrypted twice, a key for decrypting the data file is embedded in the read apparatus, another key for decrypting the data file is stored in the sever apparatus;

sending a download request to the network server for caching the data file into the temporary storage of the client apparatus;

after receiving the download request, further encrypting, by the server apparatus, the requested data file, and sending the further encrypted data file to the client apparatus;

wherein, the corresponding decrypting key is stored in the client apparatus;

decrypting, by the server apparatus or client apparatus, the data file using the key stored in the server apparatus;

caching, by the client apparatus, the decrypted data file into the temporary storage, further decrypting, by the client apparatus, decrypted data file cached in the temporary storage using the decrypting key stored in the client apparatus;

caching, by the client apparatus, the further decrypted data file into the temporary storage;

further decrypting, by the read apparatus, the data file decrypted and cached in the temporary storage using the key embedded in the read apparatus and caching the data file further decrypted into the temporary storage;

wherein the data file decrypted and cached in the temporary storage is obtainable by the read apparatus of the client apparatus for human recognition of the content of the data file, and wherein the read apparatus is not capable of transferring the data file saved in the temporary storage to a different medium.

12. The method according to claim 11, wherein the data file is encrypted utilizing a dynamic synchronous hopping code encryption pattern, in which initial keys are set in advance in the network server and the client apparatus, and the keys hop at each transmission to encrypt and decrypt the transmitted data file.

13. The method according to claim 11, wherein the data file is encrypted utilizing a dynamic encryption pattern, in which the client apparatus randomly generates a public key and a private key and sends the public key to the network server for encrypting the data file and decrypts the data file in the client apparatus with the private key.

14. The method according to claim 11, wherein the data file is encrypted by dynamically using a random cipher key, and the cipher key is sent to the client apparatus.

15. The method according to claim 11, further comprising:
deleting, by the client apparatus in real time, the encrypted data file from the temporary storage after decrypting the encrypted data file.

16. The method according to claim 11, further comprising:
deleting, by the read apparatus in real time, the data file cached in the temporary storage after utilizing the data file.

17. The system according to claim 1, wherein
part or whole of the key stored in the server apparatus is associated with hardware parameters of the server apparatus.

18. The method according to claim 11, further comprising:
dividing, by the server apparatus, data files in the data file storage into sub files according to a determined page dividing policy, and
wherein the data file sent to the client apparatus is a sub file.

19. A system of accessing a copy-prevented encrypted data file transmitted over a network, the system comprising:
a server apparatus having data files encrypted twice, a key for decrypting the data files is embedded in a read apparatus in a client apparatus, another key for decrypting the data files is stored in the sever apparatus; and
the client apparatus comprising the read apparatus and a temporary storage, wherein a data file in a server apparatus is further encrypted when accessed through the network by the client apparatus, wherein the corresponding decrypting key is stored in the client apparatus other than the read apparatus;

wherein the encrypted data file is received by the client apparatus and cached in the temporary storage, and the key stored in the sever apparatus is sent to the client apparatus; the encrypted data file cached in the temporary storage is decrypted by the decrypting key stored in the client apparatus other than the read apparatus and the key stored in the sever apparatus and received by the client apparatus; and the decrypted data file is cached in the temporary storage and further decrypted by the read apparatus using the key embedded in the read apparatus, and the data file further decrypted and cached in the temporary storage is obtainable by the read apparatus for human recognition of the content of the data file, and further wherein the read apparatus is not capable of at least one of printing and saving as.

20. The system according to claim 19, wherein the read apparatus is further capable of deleting the data file from the temporary storage in real time after utilizing the data file.

* * * * *